United States Patent [19]

Engan

[11] Patent Number: 5,430,587
[45] Date of Patent: Jul. 4, 1995

[54] CASSETTE-ACTIVATED MECHANISM FOR INWARDLY OPENING RECORDER DOOR

[75] Inventor: Bjørn Engan, Ulvenveien, Norway

[73] Assignee: Tandberg Data Storage A/S, Oslo, Norway

[21] Appl. No.: 88,801

[22] Filed: Jul. 8, 1993

[51] Int. Cl.⁶ ........................................ G11B 15/675
[52] U.S. Cl. ................................................ 360/96.5
[58] Field of Search ............... 360/96.5, 96.6, 99, 360/99.02, 92; 369/77.1, 77.2; 242/326, 326.1, 335, 338, 338.4, 339, 347, 347.1

[56] References Cited

U.S. PATENT DOCUMENTS

| | | | |
|---|---|---|---|
| 3,976,262 | 8/1976 | Kennedy | 360/96.5 |
| 4,573,091 | 2/1986 | Barton, Jr. et al. | 360/93 |
| 4,622,606 | 11/1986 | Rudi | 360/96.5 |
| 4,768,113 | 8/1988 | Sato | 360/96.5 |
| 4,835,636 | 5/1989 | Kanai et al. | 360/96.5 |
| 4,918,549 | 4/1990 | Katono et al. | 360/96.5 |
| 4,953,045 | 8/1990 | Taga | 360/96.5 |
| 5,050,022 | 9/1991 | Aizawa | 242/338.4 |
| 5,204,792 | 4/1993 | Bryer | 360/96.5 |

FOREIGN PATENT DOCUMENTS

| | | | |
|---|---|---|---|
| 58-094158 | 6/1983 | Japan | 360/96.5 |
| 61-208661 | 9/1986 | Japan | 360/96.5 |
| 1-116953 | 5/1989 | Japan | 360/96.5 |
| 2-007261 | 1/1990 | Japan | 360/96.5 |
| 2-031362 | 2/1990 | Japan | 360/96.5 |
| 2-058755 | 2/1990 | Japan | 360/96.6 |

Primary Examiner—A. J. Heinz
Assistant Examiner—Craig A. Renner
Attorney, Agent, or Firm—Hill, Steadman & Simpson

[57] ABSTRACT

A hinged door is provided for covering the slot opening in a magnetic recorder housing through which tape cassettes are loaded and unloaded. The door rotates inwardly of the recorder housing when opened. A specially configured fulcrum device is disposed within the recorder housing and connected to the door to normally bias the door closed. For loading a cassette into the recorder housing, the biasing force exerted by the fulcrum device on the door is overcome by the force of the operator pressing the inwardly facing, leading edge of the cassette against the door. Upon unloading of a cassette from the recorder housing, the bottom surfaces of the cassette engage a cam surface connected on the fulcrum device and the cassette is pressed down on the cam surface so as to again overcome the biasing force on the fulcrum, such that the door is swung open in advance of the cassette being ejected from the recorder housing.

5 Claims, 2 Drawing Sheets

CASSETTE-ACTIVATED MECHANISM FOR INWARDLY OPENING RECORDER DOOR

BACKGROUND OF THE INVENTION

The invention relates to a magnetic tape recorder in which an elongate, rectangular tape cartridge or cassette is endwise loaded and unloaded from a rectangular recorder housing. In particular, the invention relates to a mechanism for opening the access door of the recorder housing, through which the tape cartridge is passed for loading and unloading.

The endwise loading and unloading of a rectangular magnetic tape cassette in a magnetic tape recorder housing has been known for some time. See U.S. Pat. No. 4,573,091. Within such magnetic tape recorders, the magnetic tape contained in the cassette records data or has its data read therefrom. The magnetic tape cassette is constructed in accordance with standard specifications, and generally appears as depicted in U.S. Pat. No. 3,976,262.

In the case of such magnetic recorders the recorder housing includes a generally rectangular base and upstanding, generally rectangular outward face wall. The outward face wall of the magnetic recorder housing is exposed to the operator for loading the tape cassette into and unloading the tape cassette from the interior of the magnetic recorder. The outward face wall of the housing is formed with a generally rectangular slot having dimensions slightly larger than the ends of the tape cassette, so that when the end of the cassette is aligned with the slot, the cassette is easily insertable therethrough. As is generally known, after the tape cassette has been partially loaded into the recorder housing through this access slot, the cassette is engaged by an automated mechanism which continues the endwise movement of the cassette until the cassette has been fully inserted into the recorder housing. When unloading of the cassette from the recorder housing is desired, the operator engages the automated mechanism within the recorder housing to reverse the process and cause the cassette to be endwise ejected through the access slot in the outward face wall, where upon the operator can manually grasp the outward facing end of the cassette and remove the cassette fully from the housing to complete the unloading.

As is also known, the access slot formed in the outward face wall of the recorder housing may be provided with a hinged door, which serves to prevent the ingress of dust and other possibly harmful matter from passing through the access slot. See, for example U.S. Pat. No. 4,622,606.

A principal object of the present invention is to enable a hinged door at the recorder housing access slot to serve reliably as a dust cover across the slot opening and yet be reliably opened in a mechanical fashion for injection and ejection of the tape cassette by the operator.

SUMMARY OF THE INVENTION

Covering the access slot in a magnetic recorder housing, through which the operator loads and unloads a magnetic tape cassette, is a door which is hinged at the top for inward rotational movement. A hard stop formed in the recorder housing frame sealably abuts the bottom end of the door preventing its outward rotation. Within the recorder housing a specially configured fulcrum device, preferably made of integrally molded plastic, is mounted for rotation about a pivot shaft disposed parallel to the door hinge. One end of the fulcrum device is connected to at least one side edge of the door. The other end of the fulcrum device is formed as a curved cam surface which extends upwardly across the plane of longitudinal movement of the cartridge in the recorder housing during loading and unloading. A spring force is applied to the fulcrum device, preferably in the form of an additional integrally molded resilient arm, to bias the rotation of the fulcrum device about the pivot shaft such that the one end applies a resilient bias on the door in the direction of outward rotation of the door about its hinge. Thus this end of the fulcrum device serves to hold the door normally closed, the bottom end of the door abutting against the hard stop.

The spring bias on the fulcrum device is overcome, during loading of a tape cassette manually by the operator, when the operator applies sufficient force against the front face of the door through the leading, inward facing end of the cassette. The spring bias on the fulcrum device is overcome, during the unloading of the tape cassette from the recorder housing, to swing the door open inward ahead of the ejection movement of the cassette from the recorder housing, by a press of the cassette at its outward facing end on the curved cam surface portion of the fulcrum device.

DETAILED DESCRIPTION OF THE PREFERRED EMBODIMENTS

Figure 1:
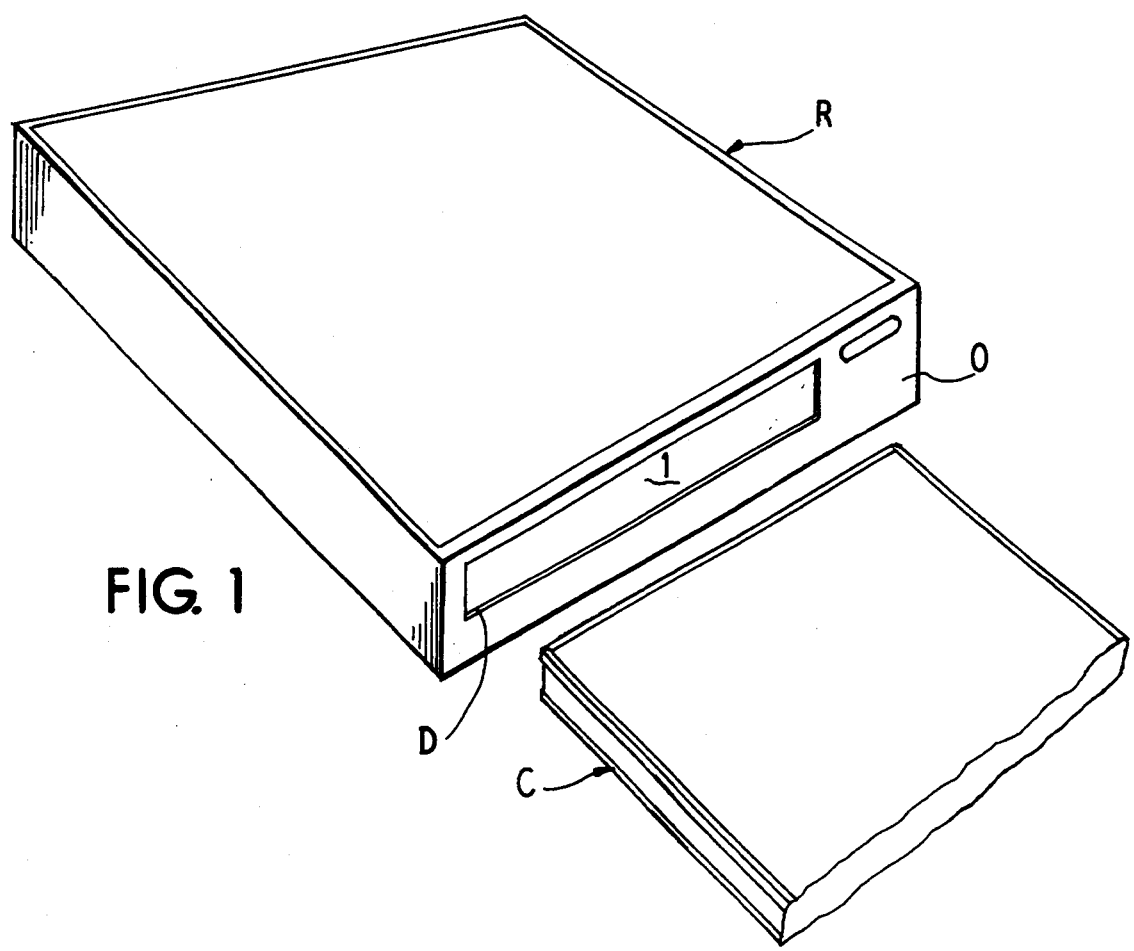
FIG. 1 is a perspective plan view of the magnetic recorder housing and a magnetic tape cassette disposed for endwise loading in the recorder.

As shown in FIG. 1, the rectangular slot D formed in the outward face wall O of a magnetic recorder housing R, and through which rectangularly shaped magnetic tape cassettes C may be endwise inserted or ejected from the confines of the recorder housing for loading or unloading, is closed by a door 1.

Figure 2:
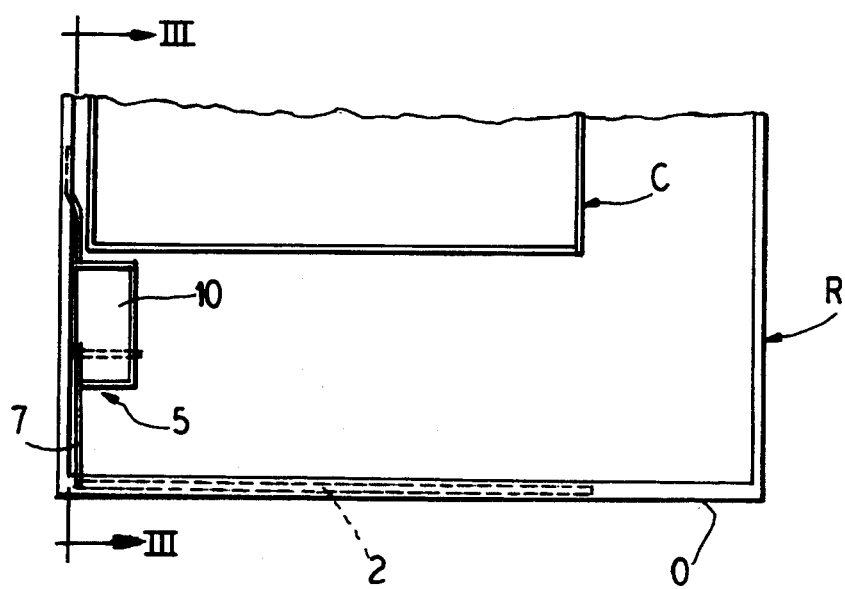
FIG. 2 is a partially schematic plan view to further define FIG. 3 et al which figures view the invention mechanism along the line III—III.
Figure 3:
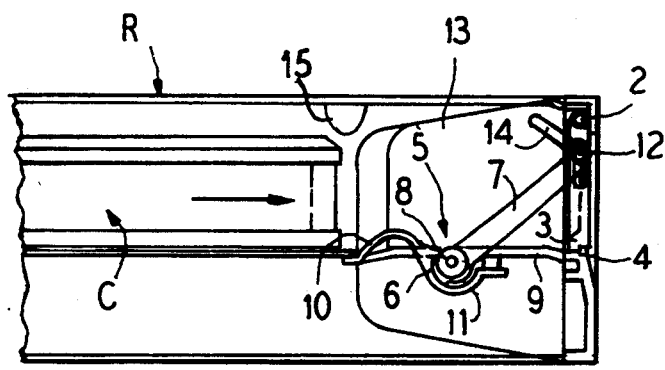
FIG. 3 is a side elevational view showing the magnetic recorder housing access door closed by operation of the invention mechanism and a tape cassette approaching the door from within the recorder housing under the influence of the automated unloader.

With reference to FIGS. 2 and 3, the door 1 is mounted for rotation about a hinge shaft 2 disposed at the top of the door and extending laterally across the outward face wall O of the recorder housing R and parallel to the length of the door 1 and the length of the rectangular slot D. The bottom end of the door is formed with an abutment member 3 which engages against a hard stop surface 4 formed in the frame of the recorder housing and also extending laterally along the outward face wall the length of the slot. The presence of the hard stop 4 prevents the door 1 from rotating outward from the recorder housing, that is, in a counterclockwise direction beyond the plane of the recorder housing face wall, as viewed in FIG. 3. Thus, the door 1 is shown in its closed position in FIGS. 2 and 3.

Situated behind the door and within the recorder housing is a door opening mechanism 5 which is a specially configured fulcrum device. In accordance with the invention, at least one mechanism 5 is positioned within the recorder housing adjacent one side edge of the door 1, although it will be appreciated that a pair of such mechanisms 5 could be utilized adjacent both side edges of the door 1. The mechanism 5 includes, preferably, a one-piece elongated member 6, which is preferably made of an integrally molded material, such as plastic.

The member 6 has a generally linear arm 7 extending outward from the base portion of the member 6 to a free end. The base portion of the member 6 is journaled on a pivot shaft 8, having a longitudinal axis parallel with the longitudinal axis of the hinge shaft 2. The outwardly extending arm 7 occupies space off to one side of a track plate 9 over which tape cassettes pass during their insertion and ejection in the recorder housing. However, extending inward from the base of the member 6 is an upwardly curved cam surface 10 of a lateral thickness, as shown in FIG. 3, which causes it to extend across the longitudinal travel path of a tape cassette passing over the track plate 9 during loading and unloading. The upward extension of the curve configuration of the cam surface 10 breaks across the horizontal planes of the tape cassette during loading and unloading, such that the bottom surface or base plate of the tape cassette engages the upper regions of the curved cam surface 10 during loading and unloading.

The member 6 is disposed for rotation about the pivot shaft 8; however, a spring force is applied in the mechanism 5 to resist the rotation of the member 6 in the counter clockwise direction as shown in FIG. 3 and actually to bias the member 6 in the clockwise direction. In accordance with the preferred embodiment, this spring force is applied to the member 6 by an integrally molded spring leg 11, which is fixed at one end to the housing frame track plate 9 and connected at its other end to the base of the member 6, as shown in FIG. 3.

The door 1 is normally held closed by the mechanism 5. There is a pin connection 12 extending between the free end of the arm 7 and a side edge of the door approximate the upper end of the door. The pin 12 also has its longitudinal axis parallel to the longitudinal axis of the door hinge rod 2. The free end of the arm 7 and the side edge of the door 1 are rotatable about the longitudinal axis of the pin 12. Between the arm 7 and the side edge of the door 1 is a stationary wall 13 which is provided with an arc-shaped groove 14 in which the pin is fitted and through which the pin 12 extends in the direction of its longitudinal axis. The groove 14 defines a travel path for the free end of the arm 7 in rotation about the pivot shaft 8. Thus, the mechanism 5 is rotatable about the pivot shaft 8 the distance of the arc defined by the groove 14.

As shown in FIG. 3, with no external force applied on the mechanism 5, the force of the spring arm 11 on the member 6 causes the free end of the arm 7 to be held at its lowermost position in the groove 14, such that the door 1 is spring-biased closed, with its bottom end 3 sealably abutting against the hard stop 4 formed on the recorder housing frame. To rotate the door 1 inwardly about its hinge shaft 2 and thus open the door, the force of the spring arm 11 must be overcome, so that the free end of the arm 7 can be made to travel upwardly along the groove 14 to the other end of the groove arc, as viewed in FIG. 3. The pin connection 12 between the free end of the arm 7 and the side edge of the door 1 causes the door to follow such rotational movement of the arm 7 and be swung open.

When the operator desires to insert a tape cassette into the recorder housing, the spring force acting on the member 6 is overcome and the door is swung open by the force of the operator pressing the inward facing, leading edge of the tape cassette C against the door 1. As the tape cassette C is inserted further into the recorder housing beneath the door swung open, the door 1 continues to be held open by the lower surfaces of the door supported and riding over the top surface of the tape cassette. After the tape cassette has been inserted sufficiently within the recorder housing to be engaged by an automated loader mechanism and withdrawn further into the recorder housing, the outward end of the tape cassette passes from underneath the door 1, and the door 1 is automatically closed under the influence of the spring force exerted by the spring arm 11 acting on the member 6 to lower the free end of the arm 7 in the groove 14 to the position again shown in FIG. 3.

When the tape cassette is to be unloaded from the recorder housing, the cassette is engaged by an automated unloader mechanism which transports the loaded cassette C, as shown in FIG. 3, longitudinally outward toward the track plate 9 and the closed door 1.

Figure 4:
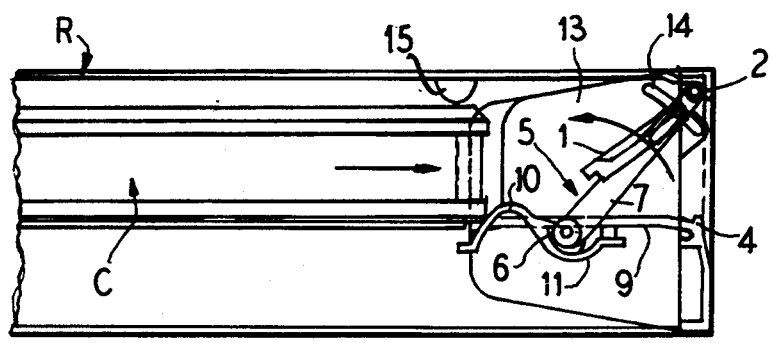
FIG. 4 is a side elevational view showing the door half-opened as a result of engagement of the invention mechanism by the approaching tape cassette being unloaded.

As shown in FIG. 4, as the loaded cassette C is conducted during unloading under the power of the automated unloader mechanism into the area of the mechanism 5, the upper surface of the cassette passes beneath and against a hold down abutment 15 which maintains the outward facing end of the cassette in an aligned longitudinal travel path defined between the track plate 9 and the hold down abutment 15. In this disposition of the cassette as it moves outwardly from the recorder housing, the bottom surfaces of the cassette are forced to engage and press down on the cam surface 10 of the mechanism 6 which cam surface, as discussed above, extends across the longitudinal travel path of the cassette.

Figure 5:
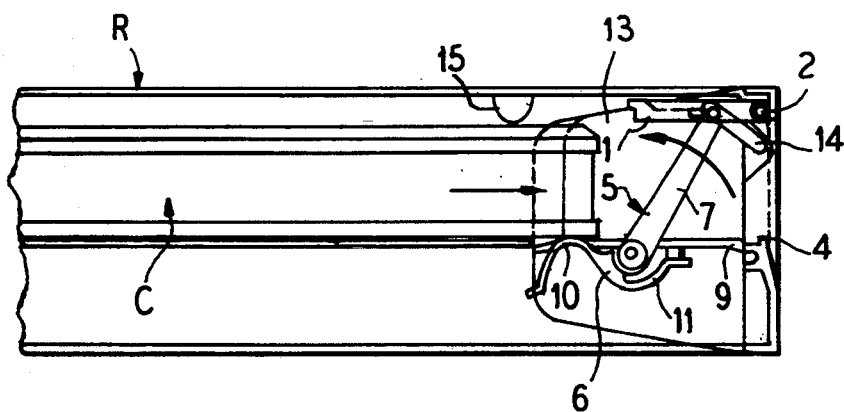
FIG. 5 is a side elevational view showing the door fully opened under the influence of the invention mechanism so that the tape cassette being unloaded can proceed out of the recorder housing.

As shown in FIG. 5, the downward force thus exerted by the cassette as it is passed beneath and against the hold down abutment 15, acts against the cam surface 10 of the member 6 and is sufficient to overcome the spring force being exerted on the member 6 by the spring arm 11 to again cause the arm 7 to travel upwardly in the arc groove 14 and open the door 1 in advance of the outward movement of the cassette. The door 1 thus remains swung open during unloading of the cassette, even after the automated unloader mechanism has ceased forced ejection of the cassette from the recorder housing, until the operator manually withdraws the cassette fully from the recorder housing. When the cassette is fully withdrawn from the recorder housing by the operator, the bottom surfaces of the cassette are no longer pressing down on the cam surface 10 of the mechanism 5 and the bottom surfaces of the door are no longer supported by the upper surface of the cassette, whereupon the door 1 again closes under the influence of the spring force exerted by the spring arm 11 which causes the arm 7 to travel back downwardly in the groove 14.

Having described a preferred embodiment of the door opening mechanism of the present invention, it should be understood that variations and modifications will occur to those skilled in the art. Accordingly, I wish to embody within the scope of the patent warranted hereon, all such embodiments as reasonably and properly come within the scope of my contribution to the art.

I claim as my invention:

1. A magnetic recorder housing having a rectangular slot formed in the outward face wall thereof and through which magnetic tape cassettes of rectangular configuration pass for loading and unloading in the recorder housing, and having an access door mechanism comprising:

a rectangular shaped door disposed on said recorder housing to cover said slot;

a hinge means on which an upper end of said door is mounted in said recorder housing for rotation of said door between a closed position and an opened position;

a generally elongated member disposed within said recorder housing and mounted for rotation on a pivot shaft about an axis parallel to the axis of rotation of said door, said elongated member having one end connected to a side edge of said door and another end formed as a curved cam surface extending from beneath a travel path of a magnetic tape cassette being unloaded from said recorder housing into said travel path such that a bottom surface of the cassette being unloaded must directly engage said curved cam surface en route to said door covering said slot; and a spring coupled to said elongated member such that said one end of said elongated member is biased to hold said door in its closed position covering said slot, wherein engagement of said bottom surface of the cassette against said cam surface overcomes the force of said spring coupled to said elongated member, causing said elongated member to pivot and swing open said door in advance of said cassette being unloaded from said recorder housing.

2. The mechanism of claim 1, wherein said door rotates inwardly of said recorder housing to open.

3. The mechanism of claim 2, wherein the rotational movement of said elongated member is defined by an arc-shaped groove formed in a wall between said one end of said elongated member and said side edge of said door and through which groove said one end of said elongated member and said side edge of said door are connected.

4. The mechanism of claim 2, wherein said spring is a spring arm with which said elongated member is integrally formed.

5. The mechanism of claim 1, further comprising an abutment located approximately above said cam surface of said elongated member, said abutment being engaged and holding down said cassette being unloaded against said cam surface.

* * * * *